(No Model.)

W. J. DAVIS.
POTATO DIGGER.

No. 345,032. Patented July 6, 1886.

WITNESSES:
Chas. Nida
C. Sedgwick

INVENTOR:
W. J. Davis
Munn & Co.
ATTORNEYS.

United States Patent Office.

WILLIAM JOHN DAVIS, OF PITTSTON, PENNSYLVANIA.

POTATO-DIGGER.

SPECIFICATION forming part of Letters Patent No. 345,032, dated July 6, 1886.

Application filed September 7, 1885. Serial No. 176,449. (No model.)

*To all whom it may concern:*

Be it known that I, WILLIAM JOHN DAVIS, of Pittston, in the county of Luzerne and State of Pennsylvania, have invented a new and useful Improvement in Potato-Diggers, of which the following is a full, clear, and exact description.

Reference is to be had to the accompanying drawings, forming a part of this specification, in which similar letters of reference indicate corresponding parts in all the figures.

Figure 1:
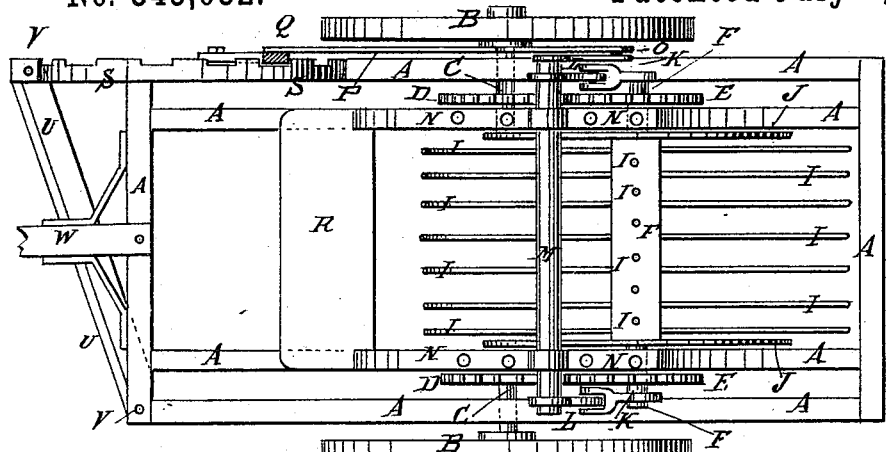
Figure 2:
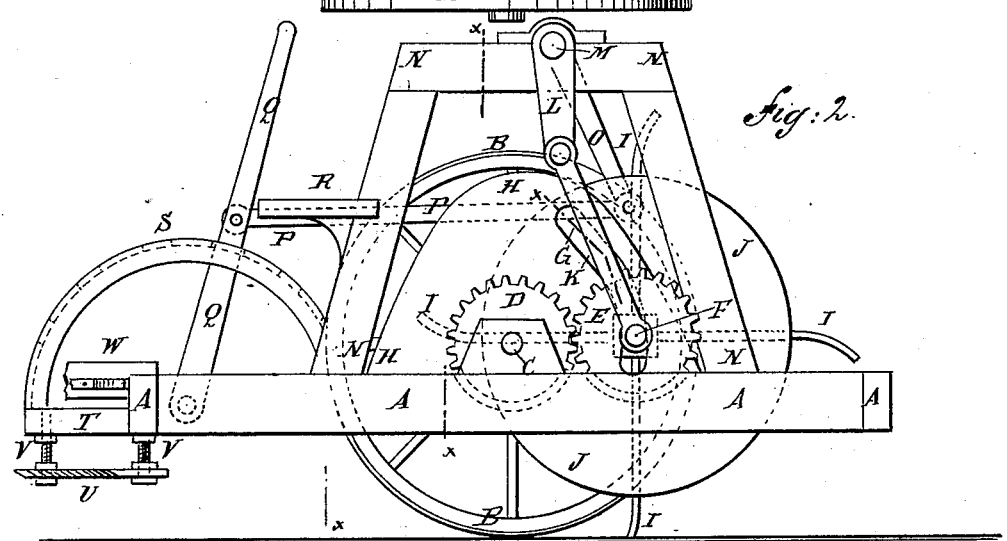
Figure 3:
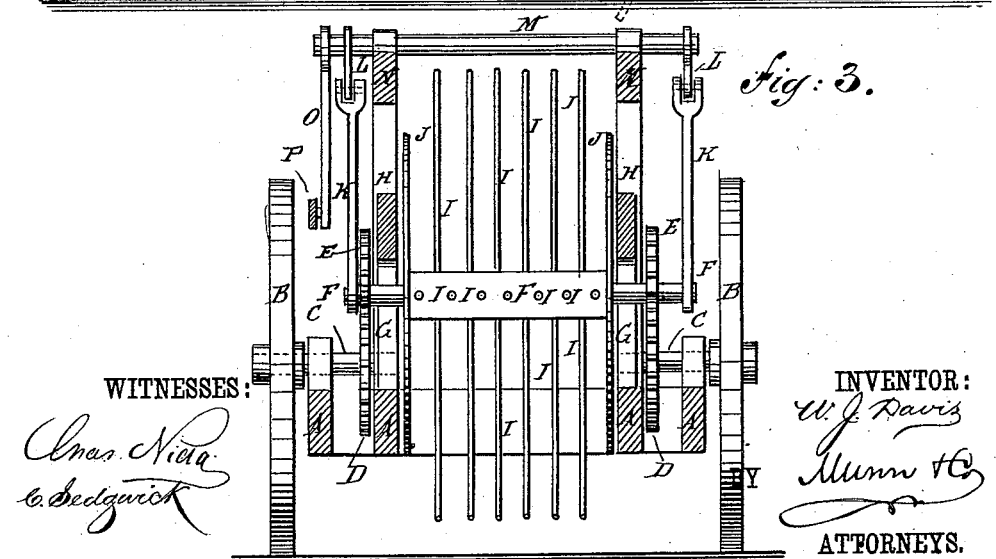

Figure 1 is a plan view of one of my improved potato-diggers, part being broken away. Fig. 2 is a side elevation of the same, part being broken away. Fig. 3 is a sectional front elevation of the same, taken through the broken line $x\,x\,x\,x$, Fig. 2, but showing the toothed shaft raised.

The object of this invention is to provide potato-diggers constructed in such a manner that the digging mechanism can be readily adjusted to work at a greater or less depth in the ground, and can be readily thrown into and out of gear.

The invention consists in the construction and combination of various parts of the machine, as will be hereinafter fully described.

A represents the frame of the machine, which is formed of side bars, two on each side, and at a little distance apart, and connected at their ends by cross-bars.

B are the drive-wheels, which are rigidly attached to the outer ends of short axles C. The axles C revolve in bearings attached to the upper sides of the pairs of side bars of the frame A.

To the axles C, between the side bars of the pairs, are attached gear-wheels D, into the teeth of which mesh the teeth of the gear-wheels E, attached to the ends of the shaft F. The journals of the shaft F revolve in bearings in slots G, formed in the wide standards or plates H, attached to the middle parts of the inner side bars of the frame A. The lower and middle parts of the slots G are curved in the arcs of circles, having their centers in the axes of the axles C, so that as the shaft F moves through the said parts of the said slots the gear-wheels D E will remain in gear. The upper parts of the slots G incline outward from the arcs of their middle and lower parts, so that as the shaft F moves through the said upper parts of the said slots the gear-wheels D E will be thrown out of gear. With this construction the shaft F can be raised and lowered to cause the teeth I, attached to it, to work at any desired depth in the ground, and can be raised to raise the said teeth above the ground, the gear-wheels D E being at the same time thrown out of gear. The teeth I are attached to the shaft F in rows, as shown in Figs. 1, 2, and 3, and their outer ends are curved forward, as shown in Fig. 2, so that they will enter the ground easily, and as they leave the ground will carry the potatoes with them over the shaft F, and drop them upon the surface of the ground at the rear of the machine.

To the shaft F, at the inner sides of the slotted standards H, and near the outer teeth I, are attached circular guard-plates J, of such a diameter that their outer edges will not extend quite to the ends of the teeth I, as shown in Figs. 1, 2, and 3. The guard-plates J prevent the potatoes from being scattered as they are raised by the teeth I and carried over the shaft F.

To the ends of the toothed shaft F are pivoted the lower ends of connecting-bars K, the upper ends of which are pivoted to the lower ends of arms L, rigidly attached to the end parts of the shaft M. The shaft M is journaled to the top bars of vertical frames N, attached to the inner side bars of the frame A, and inclosing the slotted standards H.

To one end of the rock-shaft M is rigidly attached the upper end of an arm, O, to the lower end of which is pivoted the rear end of a connecting-bar, P. The forward end of the connecting-bar P is pivoted to the lever Q, the lower end of which is pivoted to a side bar of the frame A, and its upper end projects into such a position that it can be conveniently reached and operated by the driver from his seat R, attached to the forward parts of the frames N. The lever Q moves along the edge of the arched bar S, the rear end of which is attached to the side bar of the frame A, and its forward end is attached to the forwardly-projecting bar T, secured to the said frame A.

The edge of the arched bar S has a series of recesses formed in it to receive the lever Q, and hold it securely in any position into which it may be adjusted.

U is a knife, one end of which is secured to the forward end of the bar T, and its other end is secured to the corner of the frame A by hand-screws V, so that the said knife can be readily raised and lowered to adjust it to cut the potato-stalks as the machine is drawn forward.

To the forward cross-bar of the frame A is rigidly attached a tongue, W, or shafts, according as the machine is to be drawn by two horses or by one.

Having thus fully described my invention, I claim as new and desire to secure by Letters Patent—

1. In a potato-digger, the combination, with the frame A and the axle C, journaled in the frame, and provided with the wheels B and the gear-wheels D, of the standards H, provided with slots G, circular in the middle and lower parts and inclined outward in the upper part, the toothed shaft F, journaled in bearings in the said slots and provided with the gear-wheels E on their ends, and means for moving the bearings of the toothed shaft in the said slots, substantially as shown and described.

2. In a potato-digger, the combination, with the frame A N and the axle C, provided with the wheels B and the gear-wheels D, of the standards H, provided with the slots G, circular in the middle and lower parts and inclined outward in the upper part, the toothed shaft T, provided with the gear-wheels E, the shaft M, having arms L O, the connecting-bars K P, and the lever Q, substantially as shown and described.

WILLIAM JOHN DAVIS.

Witnesses:
   E. F. BOHAN,
   CHAS. S. SHEPPARD.